(12) United States Patent
Yassin (10) Patent No.: US 8,533,213 B2
(45) Date of Patent: Sep. 10, 2013

(54) APPARATUS AND METHOD FOR INTEGRATING APPLICATIONS INTO A COMPUTERIZED ENVIRONMENT

(75) Inventor: Ohad Yassin, Tel Mond (IL)

(73) Assignee: SAP Portals Israel Ltd., Raanana (IL)

( * ) Notice: Subject to any disclaimer, the term of this patent is extended or adjusted under 35 U.S.C. 154(b) by 455 days.

(21) Appl. No.: 12/485,925

(22) Filed: Jun. 17, 2009

(65) Prior Publication Data

US 2010/0325122 A1 Dec. 23, 2010

(51) Int. Cl.
G06F 17/30 (2006.01)

(52) U.S. Cl.
USPC .......................... 707/759; 707/693; 707/713

(58) Field of Classification Search
None
See application file for complete search history.

(56) References Cited

U.S. PATENT DOCUMENTS

| | | | | |
|---|---|---|---|---|
| 5,721,925 | A * | 2/1998 | Cheng et al. | 719/315 |
| 7,512,602 | B2 * | 3/2009 | Broder et al. | 1/1 |
| 7,725,454 | B2 * | 5/2010 | Kamani et al. | 707/711 |
| 7,849,065 | B2 * | 12/2010 | Kamani et al. | 707/705 |
| 8,019,782 | B2 * | 9/2011 | Song et al. | 707/791 |
| 8,037,007 | B2 * | 10/2011 | Jeong et al. | 706/48 |
| 2005/0033779 | A1 * | 2/2005 | Seki et al. | 707/202 |
| 2007/0282879 | A1 * | 12/2007 | Degenkolb et al. | 707/101 |
| 2008/0005151 | A1 * | 1/2008 | Iwakura | 707/102 |
| 2008/0033921 | A1 * | 2/2008 | Arrouye et al. | 707/3 |
| 2008/0089435 | A1 * | 4/2008 | Torrubia et al. | 375/295 |
| 2008/0250323 | A1 * | 10/2008 | Huff | 715/733 |
| 2009/0019023 | A1 * | 1/2009 | Arrouye et al. | 707/4 |
| 2009/0024587 | A1 * | 1/2009 | Kamani et al. | 707/3 |
| 2009/0063230 | A1 * | 3/2009 | Broussard et al. | 705/7 |
| 2009/0105987 | A1 * | 4/2009 | Song et al. | 702/181 |
| 2009/0228439 | A1 * | 9/2009 | Manolescu et al. | 707/3 |
| 2009/0307262 | A1 * | 12/2009 | Jeong et al. | 707/103 R |
| 2009/0327277 | A1 * | 12/2009 | Sanborn et al. | 707/5 |
| 2010/0211559 | A1 * | 8/2010 | de Morentin Martinez et al. | 707/707 |
| 2010/0299200 | A1 * | 11/2010 | Delli Santi et al. | 707/748 |
| 2010/0306187 | A1 * | 12/2010 | Arrouye et al. | 707/711 |
| 2011/0016106 | A1 * | 1/2011 | Xia | 707/706 |

* cited by examiner

Primary Examiner — Matt Kim
Assistant Examiner — Hua Lu
(74) Attorney, Agent, or Firm — Soroker-Agmon (57) ABSTRACT

A method and apparatus for automatically suggesting further applications to a user using an executed application in a computerized environment, comprising receiving metadata provided by the executed application; searching an index for suggested applications which receive as input the data provided by the executed application; assigning a priority for each of the suggested applications; sorting the suggested applications according to the priority; and displaying to the user a list comprising the applications that received the highest priorities.

15 Claims, 4 Drawing Sheets

APPARATUS AND METHOD FOR INTEGRATING APPLICATIONS INTO A COMPUTERIZED ENVIRONMENT

TECHNICAL FIELD

The present disclosure relates to computerized applications in general, and to an apparatus and method for integrating applications into environments such as portals, in particular.

BACKGROUND

A portal is a computerized framework integrating information, applications, utilities and other elements. A portal usually provides an access point, often in the form of a web-based user interface, and is designed to aggregate and optionally to personalize information through application-specific components, optionally referred to as portlets. A portal may be a publicly available portal, or an enterprise-portal, intended only for the enterprise employees and associates.

A common problem associated with maintaining a portal relates to the addition of new applications, and sometimes also to the enhancement of existing applications. The new or enhanced applications have to be made accessible from the existing graphic user interface (GUI), and should be connected to the relevant contents.

For example, if a Geographic Information System (GIS) is added to an existing system, it should be made available to all relevant applications, such as employee directory in order to present the address of a current employee, a store location page in order to show the store locations on a map, or the like.

Thus, some association has to be made between the new application and each of the relevant existing ones, including remotely relevant ones.

Further, the added application should be activated with the relevant information, such as the address of the employee, a relevant part number in a warehouse management application, or the like.

Another aspect of the problem is that often, the real-estate, i.e., the available display area or the relevant part thereof is already fully used, and the addition of a new control for activating the new application may necessitate the evacuation of another one. A similar situation may occur when the number of available applications outperforms the available display area. In yet another situation, the display area may be too loaded for a user to even notice the newly available application.

Thus, new and useful applications may go unnoticed by users, who are therefore not getting the benefits of the development efforts invested by the organization.

All the abovementioned problems increase the Total Cost of Development (TCD) and also the Total Cost of Ownership (TCO) of applications in a portal. Experience demonstrates that sometimes more significant resources are required for integrating a new application in an environment than those required for the development of the application.

There is thus a need in the art for a method and apparatus for integrating new or enhanced applications into complex environments such as portals. The method and apparatus should enable such integration at minimal manual work, both on the connectivity between the new application and the existing ones, and on the user interface of the integration.

SUMMARY

A method and apparatus for suggesting relevant application to users using a first application. The method and apparatus enable the users to get to know additional applications, and invoke them with the relevant parameters as retrieved from the first application. Matching the application is done according to the meta data provided or consumed by the application, and the actual data or parameters are converted if required.

In accordance with a first aspect of the disclosure, there is thus provided a method for automatically suggesting one or more applications to a user using an executed application in a computerized environment, comprising: receiving data provided by the executed application; searching an index for one or more suggested applications which receive metadata provided by the executed application; and displaying to the user the at least one suggested application, using the data provided by the executed application. The method can further comprise receiving metadata provided by the executed application. The method can farther comprise filtering the suggested applications according to permissions of the user. The method can further comprise converting data provided by the executed application to data received by ant of the suggested applications. The method can further comprise activating any of the suggested applications with data provided by the executed application. Within the method the environment is optionally a portal. Within the method, the data provided by the executed application is optionally user data or application data. The method can further comprise: indicating the metadata provided by the executed application; indicating the metadata received by any of the suggested applications; and registering the executed application and the suggested applications with the index. The method can further comprise providing a conversion from the data provided by the executed application to data received by any of the suggested applications. The method can further comprise assigning a priority for each of the suggested applications; and sorting the suggested applications according to the priority, wherein the suggested applications are displayed to the user sorted in descending priority order. The method can further comprise converting the data provided by the executed application to data received by the suggested applications having highest priority assigned.

Another aspect of the disclosure relates to an apparatus for automatically suggesting further applications to a user of an executed application in a computerized environment, comprising: apparatus for automatically suggesting further applications to a user of an executed application in a computerized environment, comprising: a detection panel for communicating with the executed application; an application matching service for selecting one or more suggested applications by matching metadata provided by the executed application with metadata received by any of the suggested applications; a provided data extraction component for extracting data provided by the executed application; and a user interface component for displaying to the user on a display device a list comprising the suggested applications, using the data provided by the executed application. The apparatus can further comprise a filtering component for filtering the suggested applications in accordance with user privileges. The apparatus can further comprise a parameter conversion component for converting data provided by the executed application to data received by any of the suggested applications. The apparatus can further comprise an activation component for activating any of the suggested applications with the data provided by the executed application. Within the apparatus, the environment is optionally a portal. Within the apparatus, the data provided by the executed application is optionally user data or application data. The apparatus can further comprise an index comprising information required for associating the executed application with each of the suggested applications.

The apparatus can further comprise a content repository for storing data related to the executed application, data related to at least one suggested applications, or a conversion between data provided by the executed application and data received by any of the suggested applications. The apparatus can further comprise an index registration component for registering the executed application and the suggested applications with the index. The apparatus can further comprise a weight determination component for associating a priority with each of the suggested applications; and a sorting component for sorting the suggested applications, wherein the suggested applications are displayed to the user sorted in descending priority order. The apparatus can further comprise a parameter conversion component for converting data provided by the executed application to data received by any of the suggested applications, having highest priority assigned.

Yet another aspect of the disclosure relates to a method for automatically suggesting further applications to a user using an executed application in a computerized environment, a suggested computerized application, comprising: receiving data provided by the executed application; searching an index for one or more suggested applications which receive metadata provided by the executed application; filtering the suggested applications according to permissions of the user; assigning a priority for each of the suggested applications; sorting the suggested applications according to the priority; converting the data provided by the executed application to data received by ay of the suggested applications; displaying to the user a list comprising at least some of the suggested applications, having highest priority, using the data provided by the executed application; and activating any of the suggested applications with the data provided by the executed application.

Yet another aspect of the disclosure relates to a tangible computer readable store medium containing a set of instructions for a general purpose computer, the set of instructions comprising: receiving data provided by the executed application; searching an index for one or more suggested applications which receive metadata provided by the executed application; displaying to the user a list comprising the suggested applications, using the data provided by the executed application.

BRIEF DESCRIPTION OF THE DRAWINGS

The present disclosure will, be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings.

DETAILED DESCRIPTION

An apparatus and method for offering to a user of a computerized system additional applications in a context aware manner.

A typical portal may comprise hundreds or thousands of applications. Therefore, a user can usually not follow and know all available applications. It is thus beneficial to suggest to the user one or more applications which can be of help, and which he may or she have not used before. The applications are suggested to the user at the right context, in an easy to use manner.

In some embodiments of the disclosure, the environment comprises an application matching service, which monitors the data available in currently active applications, and determines one or more applications that receive or require as input the available data. The relevant applications are optionally sorted according to priority, and for the most appropriate ones the data provided by the executed application, i.e., the context, is passed from the executed application to the suggested application, and optionally converted into data format as required by the suggested application. The user can then select any of the suggested applications, which is thus activated with the relevant data.

The apparatus and method suggest to a user one or more applications which are appropriate under the current circumstances. The considerations as to which applications are to be suggested include: the identity or role of the user; the applications the user is currently using; the other available applications; organization policy, such as desire to encourage users to experience with a new application; users' indications and past decisions; application rating as indicated by the same user or by other users, or the like.

In order to determine which applications are to be suggested to a user, for each available application the metadata received as input and required formats, and the metadata that can be supplied by currently executed applications are matched. Therefore, in order to be integrated into the system, the metadata received or required by each application, as well as metadata an application makes available to other applications is indicated, so that the application matching service can consider the metadata provided by a currently executed application, user data, or others, and the metadata received by applications to be suggested. The executed application sends the actual data it holds to the suggested application according to matches of the meta data. For example, if application A holds a "part number" field, and the suggested application B receives a "part number", then application B will be matched and can be suggested when application A is executed. If in a particular execution of application A the available part number has the value of "1001", this particular number is provided to application B when application B is suggested and activated.

It will be appreciated that the data provided by an executed application is not limited to data explicitly output by the application such as calculation results, but also to data available to the application, such as part number for which the application shows information.

For example, a warehouse application makes available, among others, the name or ID of a person who ordered a particular part, and the addresses of the manufacturers. Then, when the warehouse application is used, a GIS application may be suggested showing the addresses of the manufacturers, or a contact application showing the details of the person that ordered the particular part.

Since the display area may be too small to show all appropriate applications, and since it is generally desirable to emphasize the more appropriate applications, the matched applications may be sorted according to a priority of precedence order, which may be determined by the system or influenced by an administrator. The current user's preferences and other users' preferences and rating may also be considered.

In order to use the relevant applications, optionally one or more parameter mappings or conversion, for mapping input parameters having reasonable or known format into a format required by a suggested application are also provided and performed.

For example, suppose a Geographic Information System (GIS) application consumes input in the format of longitude and latitude coordinates. Therefore, parameter mappings will be defined for converting from an address, i.e. country, city, street and number combination into longitude and latitude coordinates, and from a degrees-minutes-seconds format into the longitude and latitude coordinates. Then, when any application is active, which can supply a location in the form of an address, in the form of a degrees-minutes-seconds combination, or in a longitude and latitude format, a GIS application may be suggested presenting that location.

In another example, a warehouse application can receive input in a form of a part number, in a form of a manufacturer ID, in a form of a serial number in a shipment ID, or others. The output will be the details of the part having the part number, the manufacturer details, or the shipment details, respectively. Each of these inputs can be received in one or more formats. If more than one input form exists for any of these parameters received by an application, parameter mapping can be defined for converting additional formats into the required format. For example, if the warehouse application receives a part number in a general format as used by the manufacturer, a parameter mapping can be defined for converting the internal part number into the general format.

The parameter conversion or mapping can use any arithmetic operation, business logic such as accessing a database, one-to-one conversion in cases in which the available data is in the required format, or the like. It will be appreciated that a sequence of conversions may be applied in order to transform a given output to a needed input. For example, an address field output may be converted to a Zip code, which is in turn converted to longitude and latitude in order to be used by a GIS.

Optionally, in order to save resources and perform more efficiently, the parameter conversion is performed only for the applications having the highest priority.

Once the relevant applications are suggested, the user can select any one or more of the suggested applications. If and when the user activates any of the suggested applications, the application may efficiently start with the relevant data loaded.

Figure 1:
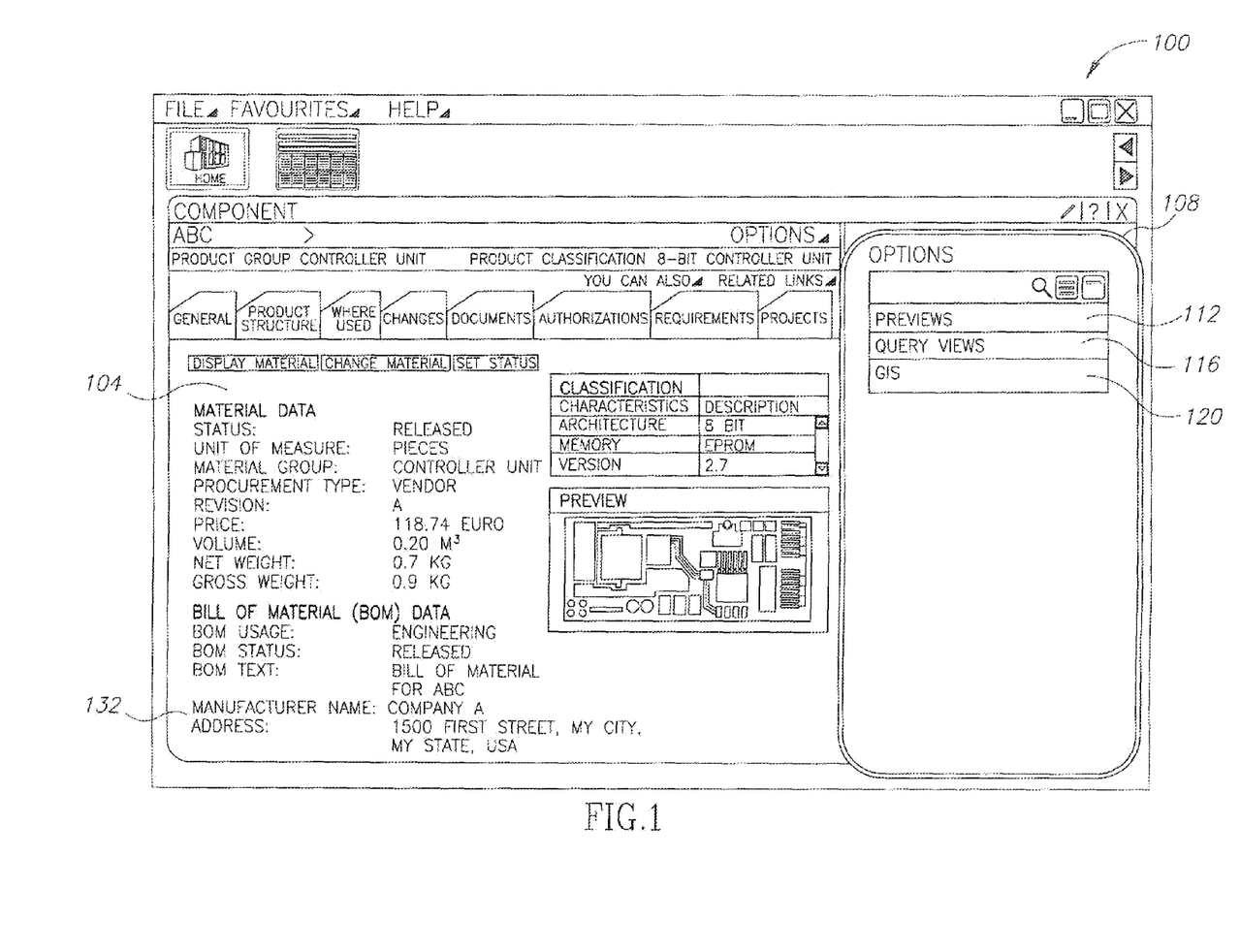
FIG. 1 is an illustrative screen shot of a first embodiment of a portal suggesting added applications in accordance with the disclosure.

Referring now to FIG. 1, showing a schematic illustration of a screen shot of an application, in accordance with an embodiment of the disclosure.

The screen, generally referenced 100 optionally shows a window or pane 104 of the currently active application, and a window, pane or another area 108. Area 108 show a list of relevant applications that can be invoked by pointing pressing or otherwise indicating the application.

Area 104 shows a data sheet of a component named "ABC", including its details, bill of material, classification, manufacturer, and an image of the component.

Area 108 enables the user to select an application out of the following applications: previews 112, showing graphs of frequently required data, such as stock levels; query view 112 providing a user interface for constructing queries related to component "ABC"; and GIS application 120, for showing a map of 1500 First Street, My City, My State, which is the address of the manufacturer as indicated in area 132. The selected application is then presented in the lower part of area 108, in a separate window, or the like. The user can then select any other of the suggested applications.

It will be appreciated that if a user selects another tab of tab list 124, other options may be displayed in area 108, which are relevant to the data that will be shown in area 104 once the other tab is selected.

Figure 2:
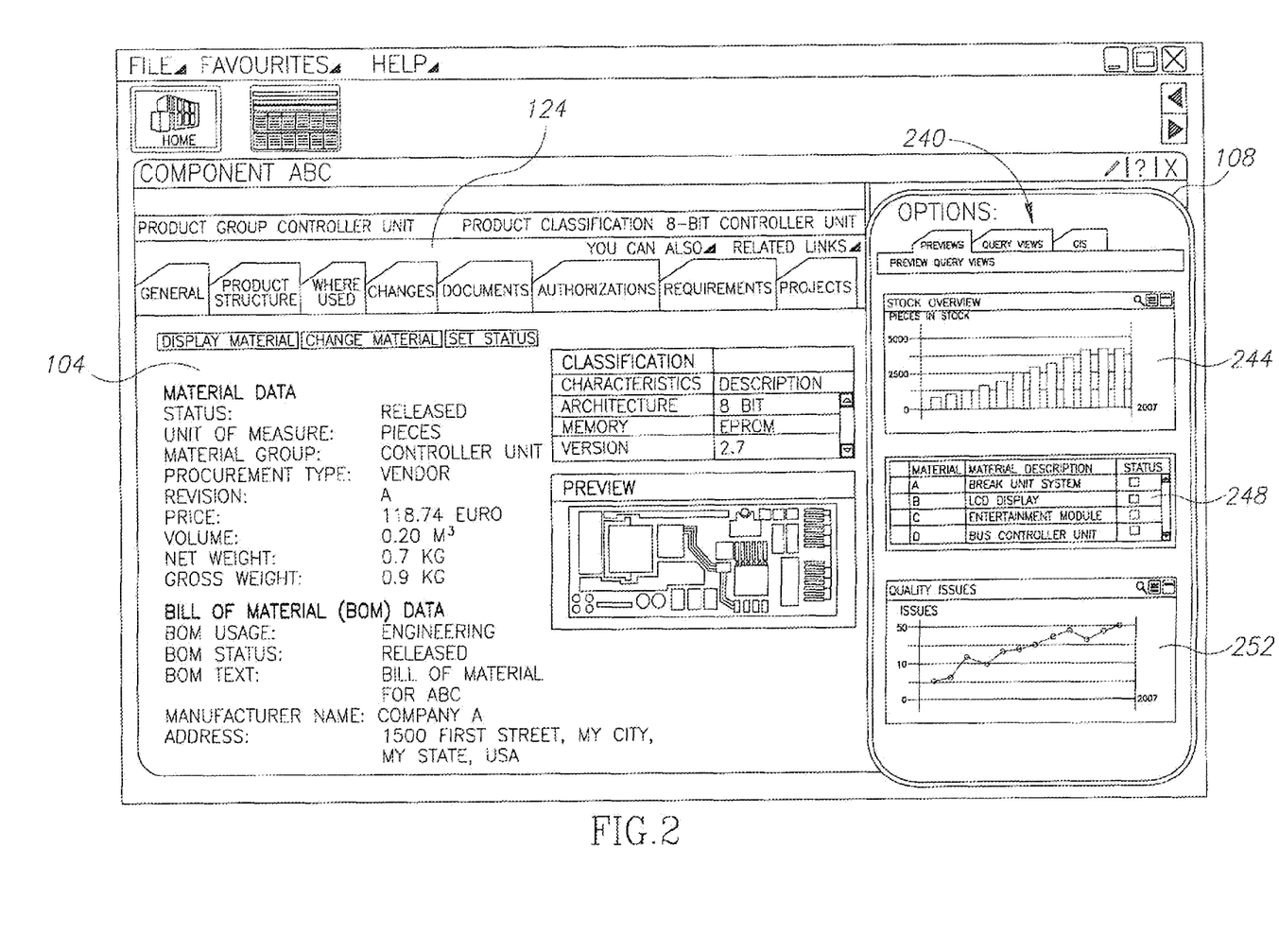
FIG. 2 is an illustrative screen shot of a second embodiment of a portal suggesting added applications in accordance with the disclosure.

Referring now to FIG. 2, showing a schematic illustration of a screen shot of an application, in accordance with another embodiment of the disclosure.

As in FIG. 1, the screen shot shown in FIG. 2 also comprises area 104 showing the currently active application, and area 208 for the proposed applications. Area 208 comprises a tab control 240, having the tabs of "Previews", "Query Views", and "GIS".

When any of tabs in tab control 240 is selected, the relevant application is shown in area 208. Thus, when "Previews" tab is selected, previews of graphs relevant for component "ABC" are presented, such as stock overview graph 244, "where used' table 248, "Quality issues" graph 252 and possibly others.

Figure 3A:
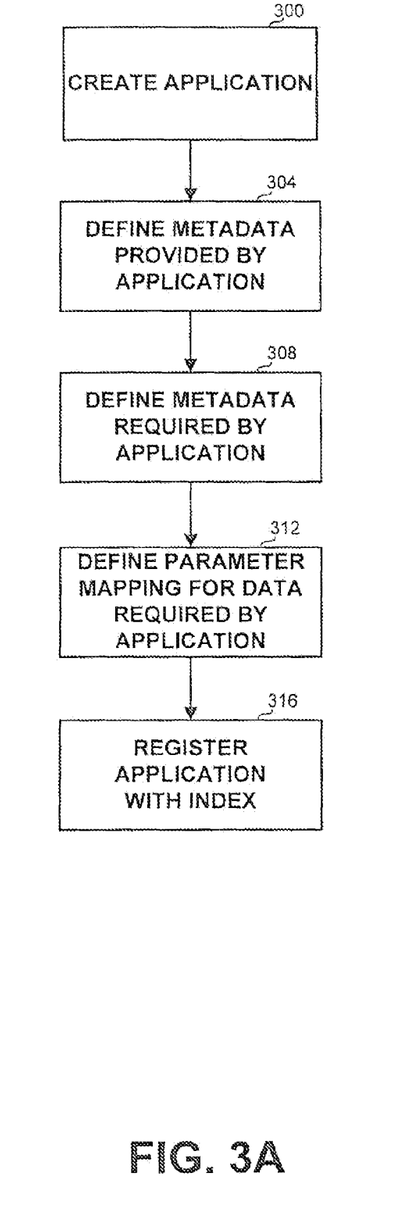
FIG. 3A is a flow chart of the main steps in a method for integrating an application with an environment, in accordance with the disclosure.

Referring now to FIG. 3A, showing the main steps in a flowchart for integrating an application with an environment, in accordance with the disclosure.

On step 300 an application is created or enhanced. The application can be implemented as one or more executables, libraries, web pages, applets, portal components, portlets, Flash movies, Adobe forms, or the like.

On optional step 304, either before or after the application is fully developed, but after its inputs and outputs are known, the metadata provided by the application and how it is retrieved, is indicated. It will be appreciated that multiple data items of multiple metadata types can be provided by each application at each state. For example, a warehouse application can provide metadata and data related to a current part, manufacturer details, general stock status and others.

On optional step 308 the metadata received by the application is determined. It will be appreciated that an application can be evoked with multiple types of metadata, and each such metadata can have multiple formats.

If step 308 is performed, i.e., if the application is to be triggered by another application, then on optional step 312 parameter mapping is defined for converting one or more known formats of the metadata received by the application, into the format acceptable by the application. For example, if the newly created or enhanced application is a GIS application, then the application may accept location indicated as a combination of longitude and altitude. Then, conversion may be defined for converting a logical address into a longitude and altitude combination, a degree-minute-second combination into a longitude and altitude combination, or the like.

It will be appreciated that the conversion can require any operation, including arithmetic or logic operations, business logics such as retrieving data from a database, one-to-one conversions such as when a location is already given as a longitude and altitude combination, or the like, or a sequence of two or more conversions.

It will be appreciated that either step 304 or steps 308 and 312 have to take place for any application, in order to integrate the application into an environment in accordance with the disclosure. Thus, each application can serve as a trigger for suggesting another application, evoked as a result of another application being active, or both.

On step 316 the application registers itself with an index, and updates a content repository with the required input, provided outputs, or parameter conversions. The index and repository can be implemented as one or more databases or database tables, one or more files such as text files or XML files, or in any other format.

Figure 3B:
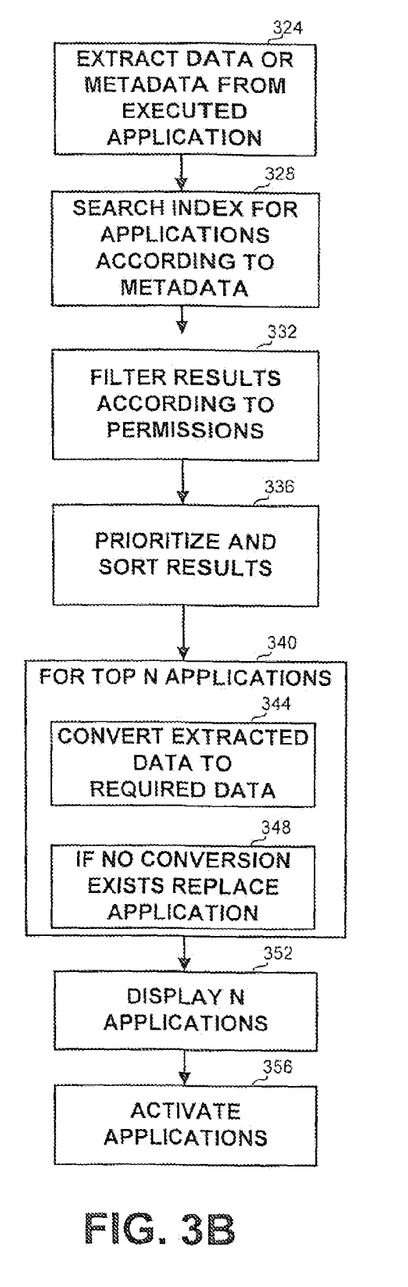
FIG. 3B is a flow chart of the main steps in a method for suggesting applications within an environment, in accordance with the disclosure.

Referring now to FIG. 3B, showing the main steps in a flowchart for suggesting applications within an environment.

On step 324 data or metadata is extracted from an executed application, such as its provided output, user information such as ID, role, permissions and others, and additional data. The metadata can include, for example the business objects, such as views, roles or others being executed by the executed applications and their operations, their respective Remote Function Calls (RFCs), service calls, or transactions. The information can be provided by the application through accessing a dedicated service such as a dedicated application, or by a service accessing the application through an Abstract Program Interface (API), or via any other communication protocol.

On step 328, the index and database are searched for relevant applications, i.e., applications which receive as input metadata which is provided as output by any of the executed applications or their objects. Also considered are applications which receive metadata that can be provided by the executed application using any of the available parameter conversions. If the executed application was not registered with the index, no information regarding its provided metadata is available. In such cases metadata information optionally extracted on step 324 may be used for matching.

On step 332 the relevant applications are filtered according to the user's permissions, i.e., applications which can not be used by a user having insufficient permission will be excluded.

On optional step 336 the resulting applications which are relevant and which the user has sufficient permissions for, are assigned a weight or priority indication, and sorted. The priority can be determined based on the following data: an importance indication associated with the application, which can be granted by the application developer, an administrator, or the like, the importance indication may change over time, for example a new application may receive higher importance to ensure it is exposed to potential users for at least a number of times or a certain period of time; a preference factor associated with the application based on multiple users' preferences, for example a multiplicity of users using the application repeatedly may increase the relative weight of the application; the number and frequency of times the user has used the application, for example if the user used the application a few times in the past but then stopped, the application may receive a lower factor; the resources consumed by the application; and the specific user's preferences, such as an explicit indication that the user wants to use the application, a specific indication that the user does not want to use the application, the user using the application repeatedly, or the like.

It will be appreciated that any one or more of the abovementioned factors can be integrated into a weight to be associated with the application. Further, one or more factors, such as the user's explicit indication can override all other factors.

This step is optional, since if only a small number of applications is suggested, for example under a predetermined threshold, then all applications can be presented without prioritizing or sorting. Preparation step 340 is performed for a predetermined number, N, of applications receiving the highest priorities, wherein N is the number of applications that can be presented and suggested to the user. N can be hardcoded, derived from the available screen space, depend on user's preferences, an administrator's configuration, or the like.

For each of the N applications that received the top scores, on step 344 the extracted data is converted to the required input, using an appropriate parameter converter. On step 348, if no conversion is found which can convert the actual data provided by the executed application to the data received by the suggested application, then the application is removed from the collection, and another application that received a lower score is added.

On step 352 the option to activate any of the top N applications is displayed to a user, and on step 356, upon user selection, the one or more applications selected out of the top N applications are activated with the relevant parameters as optionally converted.

Figure 4:
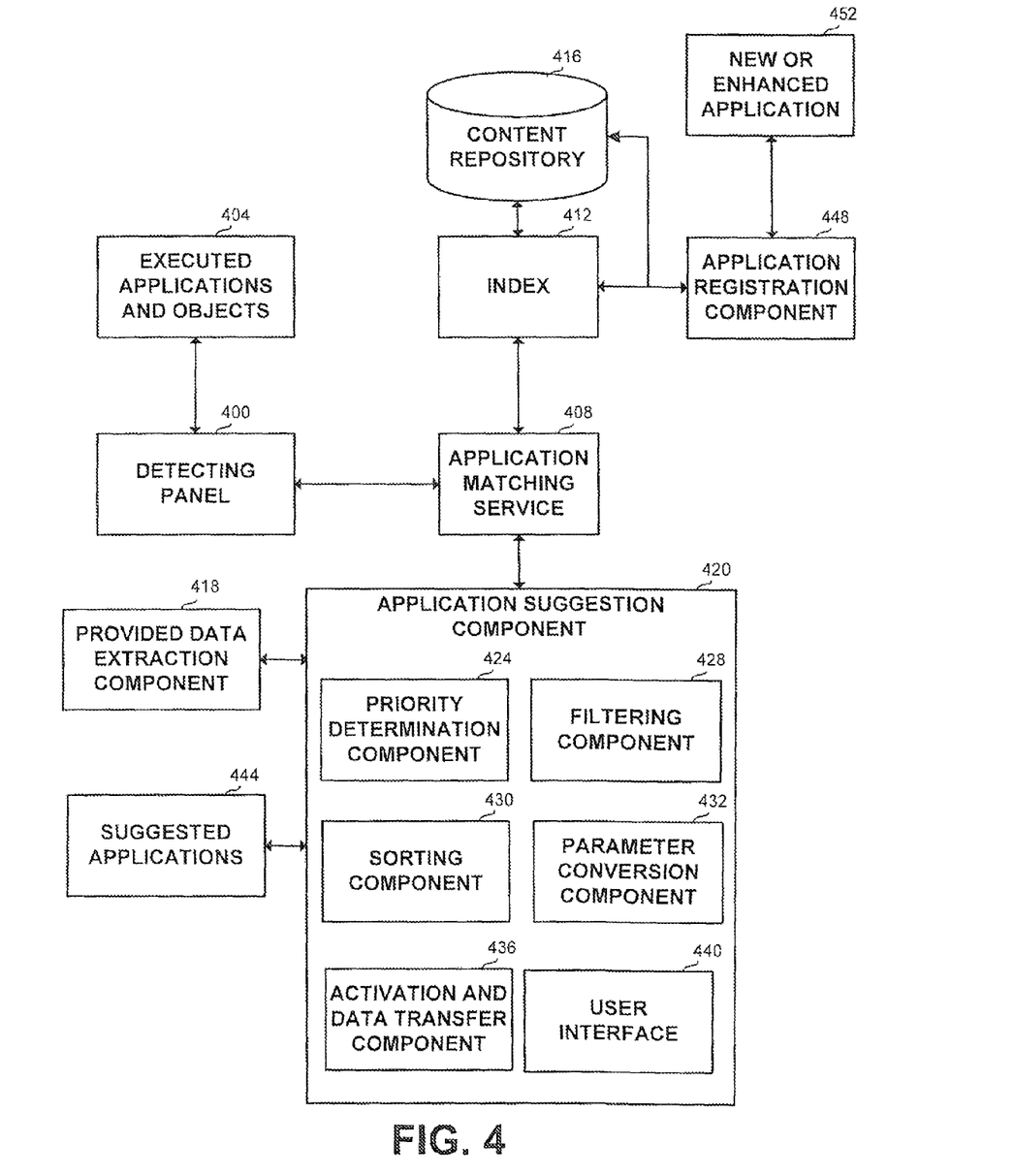
FIG. 4 is a block diagram of the main components in an apparatus for application integration in accordance with the disclosure.

Referring now to FIG. 4, showing a block diagram of the main components in an apparatus for application integration in accordance with the disclosure.

The apparatus comprises a detecting panel 400, which is an application or a service executed by a computing platform. Panel or application 400 communicates with applications and objects 404 executed by the computing platform, in order to enable search for additional applications or services that can be suggested to provide additional functionality to the user. The communication between panel 400 and applications and objects 404 can be performed via any communication protocol, and can be initiated by either panel 400 or by applications 404.

Panel 400 optionally receives information from the executed applications and objects, and communicates it to application matching server 408. Application matching server 408 searches index 412 for applications that receive as input the metadata that, can be provided by any one or more of executed applications 404. The metadata provided by executed applications 404 can be detected either by searching the index, if any of applications 404 or objects thereof had been registered with the index, or by panel 400 communicating with the application and searching for known types of metadata such as "part number".

Index 412 communicates with, or is a part of content repository 416 which contains the inputs received by each application, the metadata each application can make available to other applications, and relevant parameter conversion utilities.

Application matching service 408 provides a collection of one or more applications out of all applications registered with index 412 and repository 416.

The application collection is received by application suggestion components 420, which generates a list of the N (or less) most preferable applications to be suggested to the user under the current circumstances, wherein N is hard coded, configurable by an administrator, set by a user, determined according to the available display area, a combination of the abovementioned factors, or determined in any other way.

Application suggestion components 420 communicates with provided data extraction component 418 which extracts the actual data from the executed application, which is required for any of the suggested applications.

Application suggestion components 420 include priority determination component 424 which assigns a weight or priority for each appropriate application, based on organization policy, application rating as provided by the user or by other users, level of correspondence between the currently executed application and the suggested application, user decision, or the like.

Filtering component 428 is designed for filtering the applications that are not permitted to be used by the particular user, due for example to insufficient privileges.

Optional sorting component 430 is responsible for sorting the suggested applications according to the weights assigned by weight determination component 424. Sorting component 430 can also provide higher priority and thus higher precedence to an application, based on the user's configuration.

Application suggestion components 420 further comprise parameter conversion component 432, for converting the data or parameters as supplied by with provided data extraction component 418 into the input as received by the suggested application, using a sequence of one or more conversions. If no conversion exists, the application is removed from the application collection and replaced by another one. In some embodiments, parameter conversion is performed only for the applications that received the highest priority values, and which are suggested to the user. There is no need to convert the parameters for these applications that received low priority and will not be suggested.

Activation and data transfer component 436 is responsible for transferring the relevant data required for activating any of suggested applications 444 which is selected by a user. The data may include general data, such as location for a GIS system, as well as user data required for determining the application's operation, including user ID, user role, enabled options, or the like.

Application suggestion components 420 further comprise one or more user interface components 440 which may include graphic user interface, textual user interface, remote activation user interface or the like.

The apparatus further comprises application registration component 448 for registering a new or enhanced application 452, or an existing application when the method is deployed, with the apparatus. In registration, the metadata provided by the application and/or metadata received by an application is registered and stored within index 412 and content repository 416. After registration, application 452 can trigger the suggestion of another application, be suggested when another application is executed, or both.

It will be appreciated that the components of the apparatus (excluding index 412 and repository 416) are interrelated sets of computer instructions, arranged as executables, libraries, web pages, portals or other units designed to be executed by a computing platform such as a general purpose computer, a personal computer, a mainframe computer, a server, a mobile device, or any other type of computing platform provisioned with a memory device, a CPU or microprocessor device, and I/O ports. Alternatively, the disclosure can be implemented as firmware ported for a specific processor such as digital signal processor (DSP) or microcontrollers, or can be implemented as hardware or configurable hardware such as field programmable gate array (FPGA) or application specific integrated circuit (ASIC).

Repository 416 can be implemented as a database stored on a mass storage device, for example an optical storage device such as a CD, a DVD, or a laser disk; a magnetic storage device such as a tape, a hard disk, Storage Area Network (SAN), a Network Attached Storage (NAS), or others; a semiconductor storage device such as Flash device, memory stick, or the like. Repository 416 can comprise a single or multiple storage devices. Repository 416 may be located on premise, or in a remote location and accessed on demand, using for example the internet as a cloud service. Index 412 can be implemented as a database table, a text file, an HTML file, or the like.

The suggested applications are displayed to a user on a display device, such as a screen, and may be activated using a pointing device such as a mouse, keyboard, joystick, touch screen, or the like.

It will also be appreciated that the disclosed apparatus, and particularly index 412 and repository 416 can be common and accessed, by multiple computing platforms used by multiple users. For example the apparatus can be executed by one or more servers, which receive Indications for applications performed on client platforms.

The disclosed method and apparatus is a specific case of a top-N recommendation problem. In the disclosed situation, data about the user is available, such as identity, role, references or other, as well as connectivity information between the currently used applications and the suggested applications, so that the data provided by any of the currently used applications is used as input for the suggested applications.

The disclosed method and apparatus automatically integrate data-providing applications with data-consuming applications, without having to specifically link any two applications. Rather, when the circumstances are such that an application can be suggested, it may be suggested, depending also on precedence considerations, without the user or an administrator directly associating the two applications. Further, the suggested application, if selected, will start with the relevant data already loaded.

The disclosed method and apparatus can be used in an environment in which the available applications and the display area they require outnumber the available display area, so there is a need to select and suggest those applications that are more likely to appeal to the user. Such environments can include portals, business client desktop applications, mobile devices, or others.

It will be appreciated that the disclosed apparatus and methods are exemplary only and that further embodiments can be designed according to the same guidelines and concepts. Thus, different, additional or fewer components or steps can be used, different steps or components can be consolidated or split into separate ones.

It will be appreciated by a person skilled in the art that the disclosed apparatus is exemplary only and that multiple other implementations can be designed without deviating from the disclosure. It will be further appreciated that multiple other components and in particular extraction and analysis engines can be used. The components of the apparatus can be implemented using proprietary, commercial or third party products.

It will be appreciated by persons skilled in the art that the present disclosure is not limited to what has been particularly shown and described hereinabove. Rather the scope is defined only by the claims which follow.

What is claimed is:

1. A method for automatically suggesting at least one application to a user using an executed application in a computerized environment, comprising:
   extracting from the executed application data associated with the execution of the executed application, thereby obtaining data provided by the executed application by extraction therefrom;
   searching an index for an at least one application as a suggested application identified as executable with the data provided by the executed application;
   filtering the at least one suggested application according to at least one permission of the user;

assigning a priority for each of the at least one suggested application;

sorting the at least one suggested application according to the priority;

converting the data provided by the executed application to data received by the at least one suggested application;

displaying to the user a list comprising the at least one suggested application, having highest priority, using the data provided by the executed application;

displaying to the user the at least one suggested application sorted in descending priority order; and activating the at least one suggested application with data provided by the executed application.

2. The method of claim 1 further comprising receiving metadata provided by the executed application.

3. The method of claim 1 wherein the environment is a portal.

4. The method of claim 1 wherein the data provided by the executed application is user data or application data.

5. The method of claim 1 further comprising:

indicating the metadata provided by the executed application;

indicating the metadata received by the at least one suggested application; and registering the executed application and the at least one suggested application with the index.

6. The method of claim 5 further comprising providing a conversion from the data provided by the executed application to data received by the at least one suggested application.

7. The method of claim 1 further comprising converting the data provided by the executed application to data received by the at least one suggested application, having highest priority assigned.

8. A computerized hardware apparatus for automatically suggesting further applications to a user of an executed application in a computerized environment, comprising:

a detection panel for communicating with the executed application;

an application matching service for selecting at least one suggested application identified as executable with data provided by the executed application by matching metadata provided by the executed application with metadata received by the at least one suggested application;

a provided data extraction component for extracting data operable by and provided by the executed application;

a filtering component for filtering at least one suggested applications in accordance with user privileges;

a weight determination component for associating a priority with each of the at least one suggested application;

a sorting component for sorting the at least one suggested applications;

an activation component for activating the at least one suggested application with the data provided by the executed application;

a parameter conversion component for converting data provided by the executed application to data received by the at least one suggested application having highest priority;

a display device wherein the at least one suggested application is displayed to the user sorted in descending priority order; and a user interface component for displaying to the user on the display device a list comprising the at least one suggested application, using the data provided by the executed application.

9. The apparatus of claim 8 wherein the environment is a portal.

10. The apparatus of claim 8 wherein the data provided by the executed application is user data or application data.

11. The apparatus of claim 8 further comprising an index comprising information required for associating the executed application with each of the suggested applications.

12. The apparatus of claim 8 further comprising a content repository for storing data related to the executed application, data related to the at least one suggested applications, or a conversion between data provided by the executed application and data received by the at least one suggested application.

13. The apparatus of claim 8 further comprising an index registration component for registering the executed application and the at least one suggested application with the index.

14. A method for automatically suggesting further applications to a user using an executed application in a computerized environment a suggested computerized application, comprising:

extracting from the executed application data associated with the execution of the executed application, thereby obtaining data provided by the executed application by extraction therefrom;

searching an index for an at least one application as a suggested application identified as executable with the data provided by the executed application;

filtering the at least one suggested application according to at least one permission of the user;

assigning a priority for each of the at least one suggested application;

sorting the at least one suggested application according to the priority;

converting the data provided by the executed application to data received by the at least one suggested application;

displaying to the user a list comprising the at least one suggested application, having highest priority, using the data provided by the executed application; and activating the at least one suggested application with the data received by the at least one suggested application.

15. A tangible non-transitory computer readable store medium containing a set of instructions for a general purpose computer, the set of instructions comprising:

extracting from the executed application data associated with the execution of the executed application, thereby obtaining data provided by the executed application by extraction therefrom;

searching an index for an at least one application as a suggested application identified as executable with the data provided by the executed application;

filtering the at least one suggested application according to at least one permission of the user;

assigning a priority for each of the at least one suggested application;

sorting the at least one suggested application according to the priority;

converting the data provided by the executed application to data received by the at least one suggested application;

displaying to the user a list comprising the at least one suggested application having highest priority, using the data provided by the executed application; and activating the at least one suggested application with the data received by the at least one suggested application.

* * * * *